(12) United States Patent
Otsuka et al.

(10) Patent No.: US 8,561,132 B2
(45) Date of Patent: Oct. 15, 2013

(54) ACCESS CONTROL APPARATUS, INFORMATION MANAGEMENT APPARATUS, AND ACCESS CONTROL METHOD

(75) Inventors: Hiroshi Otsuka, Kawasaki (JP); Yasuhide Matsumoto, Kawasaki (JP); Yuji Wada, Kawasaki (JP); Masazumi Matsubara, Kawasaki (JP); Yukihiro Watanabe, Kawasaki (JP); Kuniaki Shimada, Kawasaki (JP); Kenji Morimoto, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 13/232,392

(22) Filed: Sep. 14, 2011

(65) Prior Publication Data

US 2012/0090014 A1 Apr. 12, 2012

Related U.S. Application Data

(63) Continuation of application No. PCT/JP2009/055520, filed on Mar. 19, 2009.

(51) Int. Cl.
*G06F 17/00* (2006.01)

(52) U.S. Cl.
USPC .......................... 726/1; 726/2; 726/5; 726/27

(58) Field of Classification Search
USPC ............................................... 726/1, 2, 5, 27
See application file for complete search history.

(56) References Cited

U.S. PATENT DOCUMENTS 7,747,709 B2 * 6/2010 Behrendt et al. ............. 709/220
7,877,782 B2 * 1/2011 Yamamoto et al. ............... 726/1
7,904,456 B2 * 3/2011 Hennan et al. ............... 707/737
8,185,550 B1 * 5/2012 Eichler et al. ............... 707/783
2008/0215713 A1 * 9/2008 Cannon et al. ............... 709/221
2011/0321177 A1 * 12/2011 Nishi et al. ...................... 726/29

FOREIGN PATENT DOCUMENTS

| JP | 2002-304317 | 10/2002 |
| JP | 2004-21450  | 1/2004  |
| JP | 2006-221399 | 8/2006  |

OTHER PUBLICATIONS

International Search Report for PCT/JP2009/055520, mailed Jun. 30, 2009.

\* cited by examiner

*Primary Examiner* — Amare F Tabor
(74) *Attorney, Agent, or Firm* — Staas & Halsey LLP

(57) ABSTRACT

An access control apparatus that controls access to an information management apparatus that stores configuration elements and relationship elements indicating relationships between the configuration elements, includes a storage unit that stores one or more predetermined configuration elements in association with user information that identifies a user and stores one or more combinations of a type of a configuration element and a type of a relationship element in association with the user information, as an access control rule set for each user, and a determining unit that determines that, when a combination of a type of a configuration element stored in the storage unit in association with user information and a type of a relationship element indicating a relationship between the configuration element and another configuration element is stored in the storage unit in association with the user information, the another configuration element is accessible.

9 Claims, 13 Drawing Sheets

| CI TYPE | RECORD INFORMATION | id | OS INFORMATION |
|---|---|---|---|
| Server | Real | r001 | aaaaa |
| Server | Real | r002 | aaaaa |
| Server | Real | r003 | bbbb |
| Network | Real | r004 | ccc |
| Server | Real | r005 | aaaaa |
| Network | Real | r006 | ccc |
| Server | Spec | s001 | aaaaa |
| Server | Spec | s002 | bbbb |
| Network | Spec | s003 | ccc |
| Service | – | v001 | – |
| Service | – | v002 | – |
| User | – | u001 | – |

| id | RELATIONSHIP TYPE | src | dst |
|---|---|---|---|
| 001 | modeled | r001 | s001 |
| 002 | modeled | r002 | s001 |
| 003 | modeled | r003 | s002 |
| 004 | modeled | r004 | s003 |
| 005 | modeled | r005 | s001 |
| 006 | modeled | r006 | s003 |
| 007 | Connected To | r001 | r004 |
| 008 | Connected To | r002 | r004 |
| 009 | Connected To | r003 | r004 |
| 010 | Connected To | r005 | r006 |
| 011 | Operated By | r004 | u001 |
| 012 | Operated By | r006 | u001 |
| 013 | Belong To | r001 | v001 |
| 014 | Belong To | r006 | v002 |

| USER INFORMATION | id OF CORE CI |
|---|---|
| engineer01 | r004 |
| engineer02 | r006 |
| manager01 | v001 |
| manager02 | r006 |
| manager02 | v002 |

| USER INFORMATION | CI TYPE | RELATIONSHIP TYPE | NUMBER OF APPLIED STEPS |
|---|---|---|---|
| engineer01 | Server | Operated By | – |
| engineer01 | Network | Connected To | 1 |
| engineer01 | Server | Connected To | 1 |
| engineer02 | Server | Operated By | – |
| engineer02 | Network | Connected To | 1 |
| manager01 | * | * | – |

| USER INFORMATION | id OF CI DETERMINED TO BE ACCESSIBLE |
|---|---|
| engineer01 | r001 |
|  | r002 |
|  | r003 |
| engineer02 | r005 |
|  | r006 |
|  | v002 |
| manager01 | r001 |
|  | v001 |

| USER INFORMATION | id OF RELATIONSHIP DETERMINED TO BE ACCESSIBLE |
|---|---|
| engineer01 | 007 |
|  | 008 |
|  | 009 |
| engineer02 | 010 |
|  | 014 |
| manager01 | 013 |

FIG.15

RELATED ART

| WORKER | id OF GRANTED CI |
|---|---|
| engineer01 | r001 |
| | r002 |
| | r003 |
| | r004 |
| | v001 |
| | u001 |
| engineer02 | r005 |
| | r006 |
| | u001 |
| manager01 | r001 |
| | r002 |
| | r003 |
| | r004 |
| | r005 |
| | r006 |
| | s001 |
| | s002 |
| | s003 |
| | v001 |
| | v002 |
| | u001 |
| manager02 | r006 |
| | v002 |

FIG.16

RELATED ART

| WORKER | id OF GRANTED RELATIONSHIP |
|---|---|
| engineer01 | 007 |
| | 008 |
| | 009 |
| | 011 |
| | 013 |
| engineer02 | 010 |
| | 012 |
| | 013 |
| manager01 | 001 |
| | 002 |
| | 003 |
| | 004 |
| | 005 |
| | 006 |
| | 007 |
| | 008 |
| | 009 |
| | 011 |
| | 012 |
| | 013 |

ACCESS CONTROL APPARATUS, INFORMATION MANAGEMENT APPARATUS, AND ACCESS CONTROL METHOD

CROSS-REFERENCE TO RELATED APPLICATION

This application is a continuation of International Application No. PCT/JP2009/55520, filed on Mar. 19, 2009, the entire contents of which are incorporated herein by reference.

FIELD

The embodiment discussed herein is directed to an access control apparatus, an information management apparatus, and an access control method.

BACKGROUND

In recent years, in order to appropriately manage a complex IT system, there are proposed methods of consolidating configuration information on an IT system by using database (see Japanese Laid-open Patent Publication No. 2006-221399). As one of such methods, a method is known in which configuration information is managed by using an information management apparatus called an FCMDB (Federated Configuration Management Database). In FIG. 13, a diagram for explaining a summary of the FCMDB is illustrated.

As illustrated in FIG. 13, the FCMDB connects to apparatuses called MDRs (Management Data Repository), each of which independently collects and manages configuration information on an IT system, with a network or the like and manages various configuration information interspersed in each MDR by virtually integrating them. A worker such as a system manager can transversely manipulate configuration information dispersion-managed by the MDRs by using the FCMDB.

As illustrated in FIG. 14, the FCMDB manages configuration information on an IT system by storing relationship information (relationship) between a configuration item (CI, Configuration Item) and a CI. The CI is provided for each element configuring an IT system, such as a server, a network, and a service, and specifically, includes information such as a node name, an IP address, and an application name. The relationship is provided between a CI and a CI and expresses what relationship these CIs have by information such as Connected To (connected to . . . ), Operated By (operated by . . . ), and Belong To (belong to . . . ).

Configuration information managed by the FCMDB is referred to by workers in various positions, such as a service manager, an operator, and a center manager, so that it is desirable to perform access control according to the position of each worker. For example, as illustrated in FIG. 14, access control is performed in such a manner that when a worker is a center manager, all configuration information can be referred to, however, when a worker is an operator, only configuration information in a range needed for operation can be referred to, whereby confidentiality of the configuration information can be maintained.

Because the number of elements configuring an IT system is large, the number of CIs and relationships stored in the FCMDB is also large. Accordingly, for example, as illustrated in FIG. 15 and FIG. 16, when attempting to set a CI and a relationship, for which access is granted, to each worker, the man-hour for the setting operation becomes large, which is not realistic. Moreover, every time a worker increases, it is needed to set whether or not access is possible with respect to all CIs and relationships for a new worker, which is inefficient.

As a method for efficiently setting an access right to an information management apparatus having a large amount of information, such as a WEB server, there is known a method such as ".htaccess" that sets an access right by using a hierarchical structure of data. Specifically, in this access right setting method, when an access right is set to a certain file, the similar access right is assumed to be set also to files (also called sub files) present in the file. With such a method, setting of an access right to a plurality of pieces of information can be performed at a time, so that the man-hour for the setting operation can be reduced significantly.

DISCLOSURE OF INVENTION

Problem to be Solved by the Invention

However, the relationship between CIs connected by a relationship does not include a relationship such as between parent data and child data as in a hierarchical structure, so that it is difficult to apply the access right setting method as described above to configuration information managed by the FCMDB.

SUMMARY

According to an aspect of an embodiment of the invention, an access control apparatus that controls access to an information management apparatus that stores a plurality of configuration elements and relationship elements indicating relationships between the configuration elements, includes: a storage unit that stores one or more predetermined configuration elements in association with user information that identifies a user and stores one or more combinations of a type of a configuration element and a type of a relationship element in association with the user information, as an access control rule set for each user; and a determining unit that determines that, when a combination of a type of a configuration element stored in the storage unit in association with user information and a type of a relationship element indicating a relationship between the configuration element and another configuration element is stored in the storage unit in association with the user information, the another configuration element is accessible.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating one example of an accessible-CI management table;

FIG. 4 is a diagram illustrating one example of an accessible-relationship management table;

FIG. 5 is a diagram illustrating one example of a core-CI management table according to the present embodiment;

FIG. 6 is a diagram illustrating one example of a type-combination management table according to the present embodiment;

FIG. 7 is a diagram illustrating one example of an accessible-CI management table;

FIG. 8 is a diagram illustrating one example of an accessible-relationship management table;

FIG. 15 is a diagram illustrating one example of accessible CIs set to each worker; and FIG. 16 is a diagram illustrating one example of accessible relationships set to each worker.

DESCRIPTION OF EMBODIMENT

With reference to the accompanying drawings, an exemplary embodiment of an access control apparatus, an information management apparatus, and an access control method disclosed herein will be explained below in detail based on the drawings. In the following embodiment, as one example of the information management apparatus, explanation is made using an FCMDB that manages configuration information on an IT system, however, the technology disclosed in the present application can be applied also to a server device that manages object-oriented data or the like.

Figure 1:
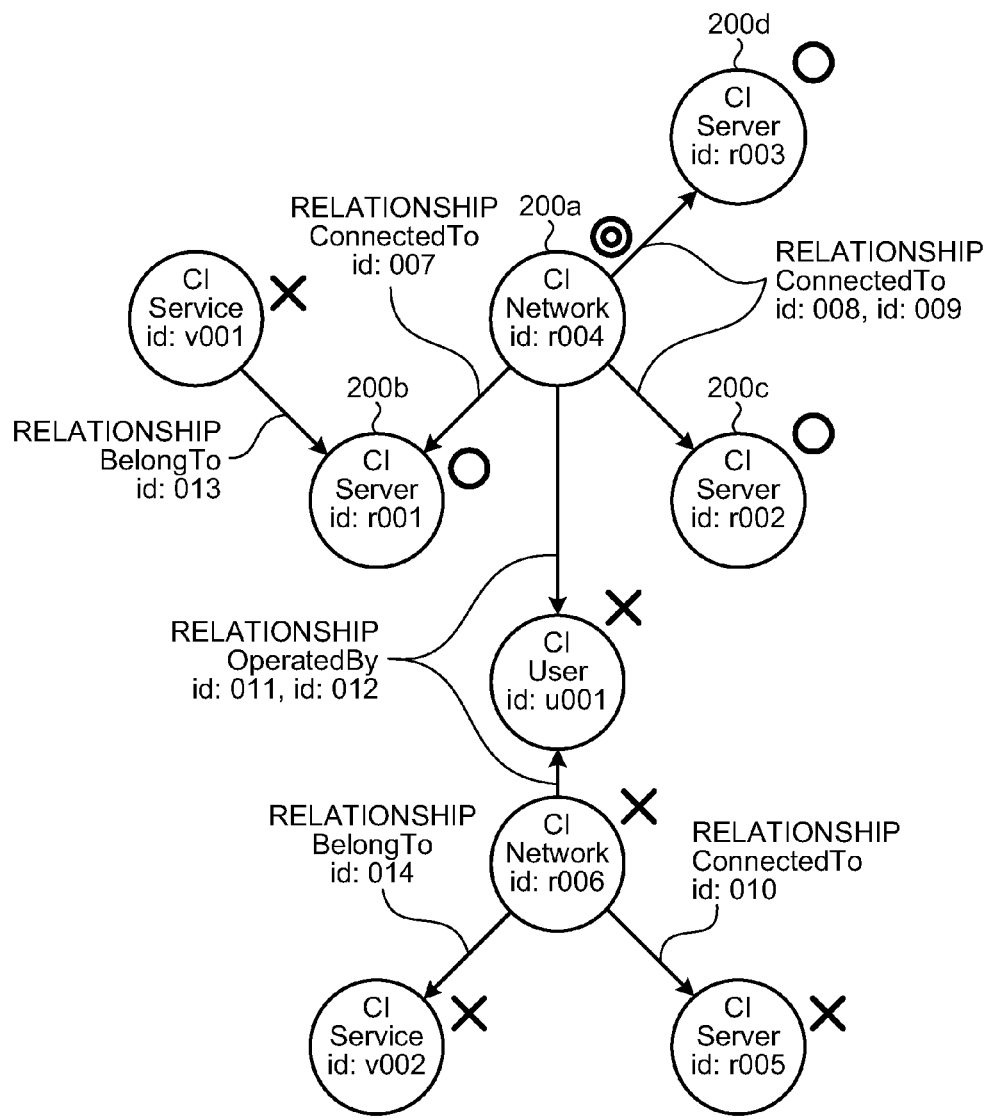
FIG. 1 is a diagram for explaining an access control method according to a present embodiment.

First, the access control method according to the present embodiment is explained by using the drawing. FIG. 1 is a diagram for explaining the access control method according to the present embodiment. The access control method according to the present embodiment controls access to the FCMDB that manages configuration information on an IT system based on an access control rule.

As illustrated in FIG. 1, the FCMDB manages configuration information on an IT system by storing relationship information (relationship) between a configuration item (CI, Configuration Item) and a CI. The CI is provided for each configuration element configuring an IT system such as a server, a network, and a service. The relationship is provided between a CI and a CI and expresses what relationship these CIs have by information such as Connected To (connected to . . . ), Operated By (operated by . . . ), and Belong To (belong to . . . ). An individual id is allocated to each of CIs and relationships.

In the access control method according to the present embodiment, an id of an accessible CI (hereinafter, called "core CI") and a pair of a CI type and a relationship type are stored as the access control rule. For example, in the example illustrated in FIG. 1, "r004" is stored as the id of a core CI and "Network, Connected TO" is set as a combination of the CI type and the relationship type.

Then, in the access control method according to the present embodiment, when the combination of the type of a CI having the id set as the id of a core CI and the type of a relationship indicating the relationship between the CI and other CIs is stored as the access control rule, the other ICs are determined to be accessible.

Specifically, for example, as illustrated in FIG. 1, assume that the type of a CI 200a having the id "r004" of a core CI is "Network", and the CI 200a and CIs 200b to 200d are connected by a relationship having the type of "Connected To". In this case, the combination "Network, Connected TO" of the CI type and the relationship type is stored as the access control rule, so that the CIs 200b to 200d are determined to be accessible.

In this manner, in the access control method according to the present embodiment, as the access control rule, the id of a core CI and the combination of the CI type and the relationship type are stored in advance, and a CI meeting the access control rule is determined to be accessible. Consequently, it is possible to efficiently perform setting of an access right with respect to configuration information on an IT system managed by the FCMDB.

Figure 2:
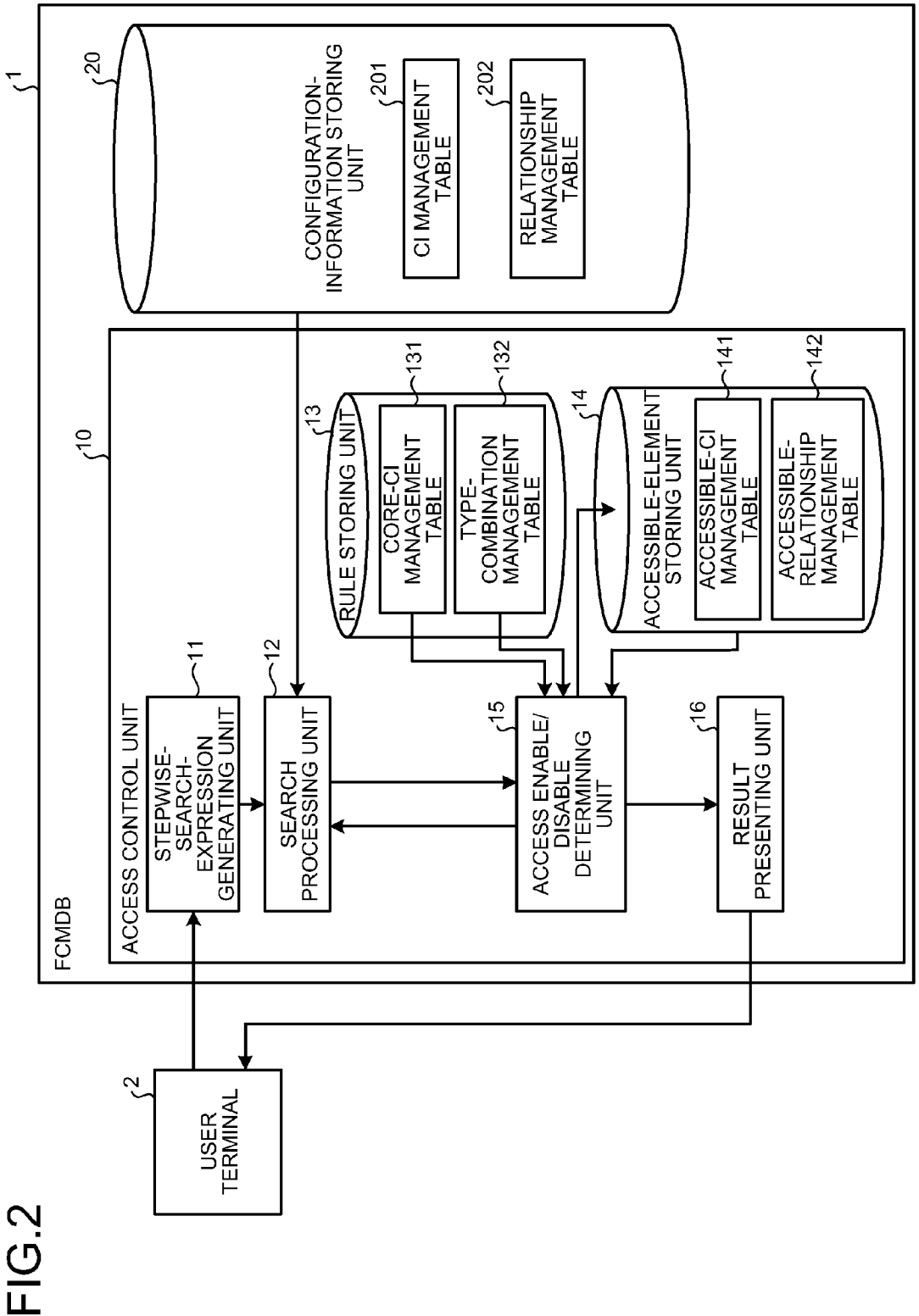
FIG. 2 is a block diagram illustrating a configuration of an FCMDB according to the present embodiment.

Next, the configuration of the FCMDB according to the present embodiment is explained. FIG. 2 is a block diagram illustrating the configuration of the FCMDB according to the present embodiment, FIG. 3 is a diagram illustrating one example of an accessible-CI management table, and FIG. 4 is a diagram illustrating one example of an accessible-relationship management table.

As illustrated in FIG. 2, an FCMDB 1 according to the present embodiment includes an access control unit 10 and a configuration-information storing unit 20. The configuration-information storing unit 20 is a storing unit that stores configuration information on an IT system, and includes a CI management table 201 that manages CIs as configuration elements and a relationship management table 202 that manages relationships that are relationship elements indicating the relationship between the configuration elements.

For example, as illustrated in FIG. 3, the CI management table 201 stores the CI type, record information, and OS information in association with the id as detailed information on a CI. The record information is information indicating whether information included in a CI is real information or design information. The real information is actual information on a device, software, or the like indicated by a CI and is indicated as "Real". The design information is design information on a device, software, or the like indicated by a CI and is indicated as "Spec". The id is identification information specific to each CI. The OS information is information on an OS loaded in a device indicated by a CI.

For example, the CI management table 201 stores the CI type "Server", the record information "Real", and the OS information "aaaa" as detailed information on the CI to which the id "r001" is allocated. In other words, the CI to which the id "r001" is allocated is the real information on the server device in which the OS information "aaaa" is loaded. The CI management table 201, for example, stores the name of a CI indicated by a model name of a server device and the like in addition to the CI type, the record information, the OS information, and the id.

Moreover, as illustrated in FIG. 4, the relationship management table 202 stores the relationship type, a src (Source), and a dst (Destination) as detailed information on a relationship. The src is information indicating the id of a CI to be the starting point for a relationship and the dst is information indicating the arrival point of a relationship.

For example, the relationship management table 202 stores the relationship type "Connected To", the src "r001", and the dst "r004" as detailed information on the relationship to which the id "007" is allocated. In other words, the relationship to which the id "007" is allocated is information indicating the connection relationship between the server device of the id "r001" and the network of the id "r004" (see FIG. 1.)

The FCMDB 1 obtains these configuration information from MDRs (not illustrated), each of which individually collects and manages configuration information on an IT system, via the network or the like.

The access control unit 10 corresponds to the access control apparatus and performs access control to the configuration-information storing unit 20. The access control unit 10 includes a stepwise-search-expression generating unit 11, a search processing unit 12, a rule storing unit 13, an accessible-element storing unit 14, an access enable/disable determining unit 15, and a result presenting unit 16.

When a search request is received from a user, the stepwise-search-expression generating unit 11 generates a stepwise search expression from a search expression included in the search request. The search request from a user is explained.

A user performs the search request for configuration information by using a user terminal 2 connected to the FCMDB 1 via a communication path such as the Internet. As the user terminal 2, a general personal computer or the like can be applied other than a dedicated computer.

In the search request, user information and the search expression are included. The user information is identification information for identifying a user who performed the search request and is, for example, an ID, a password, or the like given to each user. The search expression specifies the type of a CI to which information is requested, the type of a relationship, and the like. For example, in the case of requesting information on a server device, i.e., information on a CI having the CI type "Server", the search expression is expressed as "/%Server". It is specified that the name thereof is the name of a CI by prepending "%" to the name.

Moreover, by alternating a CI and a relationship with "/" as a separator, search to trace the relationship between CIs becomes possible. For example, in the case of requesting information on a manager of a server device, the search expression is expressed as "/%Server/&Managed By/%Person". "&" indicates that information appended thereto is the relationship type.

Moreover, by appending "*" to "%" or "&", search in which all of the CI types or the relationship types are specified can be performed. For example, the search expression expressed as "/%Server/&*/%Person" indicates that information on a person having any relationship with the CI type "Server" is requested.

Moreover, by appending information, which specifically specifies a CI to request, to the CI type, detailed search for a CI can be performed. For example, the search expression requesting information on a server device managed by a manager A is expressed as "/%Server[&Managed By/%Person A]".

Moreover, in the case of requesting any information on a CI or a relationship, the search expression is expressed by "entity-id(**)" ("**" is the id of a CI or a relationship to request)". In this manner, in the present embodiment, the search expression of configuration information specifies a CI to be the starting point for search and furthermore specifies the order of tracing relationships or CIs with the CI as the starting point.

The stepwise-search-expression generating unit 11 generates the stepwise search expression based on the search expression obtained from the user terminal 2. The stepwise search expression is a search expression indicating each step of a search process based on the search expression obtained from the user terminal 2 and is generated by dividing the search expression in "/" units. For example, when the search expression specified by "%Network[id=r004]/&Connected TO/%*" is received from the user terminal 2, the stepwise-search-expression generating unit 11 generates the search expressions indicated by "%Network[id=r004]", "%Network[id=r004]/&Connected TO", and "%Network[id=r004]/&Connected TO/%*" as the stepwise search expressions.

Based on the stepwise search expression generated by the stepwise-search-expression generating unit 11, the search processing unit 12 performs search for configuration information requested by the stepwise search expression with respect to the configuration-information storing unit 20. For example, the search processing unit 12 performs search based on the stepwise search expression "%Network[id=r004]" (i.e., search expression requesting information on the network having the id "r004"), and whereby retrieves detailed information on the CI 200a illustrated in FIG. 1 from the configuration-information storing unit 20 as a search result.

In the similar manner, when the search processing unit 12 performs search based on the stepwise search expression "%Network[id=r004]/&Connected TO" (search expression requesting information on a relationship indicating the connection relationship between the network having the id "r004" and other CIs), the search processing unit 12 retrieves detailed information on three relationships of the ids "007", "008", and "009" from the configuration-information storing unit 20 as search results.

The rule storing unit 13 stores the access control rules used when performing access control to the configuration-information storing unit 20. Specifically, the rule storing unit 13 stores a core-CI management table 131 and a type-combination management table 132. The configurations of the core-CI management table 131 and the type-combination management table 132 are explained. FIG. 5 is a diagram illustrating one example of the core-CI management table according to the present embodiment. FIG. 6 is a diagram illustrating one example of the type-combination management table according to the present embodiment.

As illustrated in FIG. 5, the core-CI management table 131 stores the id of a core CI in association with the user information. The core CI indicates a CI stored in the core-CI management table 131 as a CI to which access is granted. For example, the core-CI management table 131 stores the user information "engineer01" in association with the id "r004" of a core CI and indicates that a user to which the user information "engineer01" is allocated has an access right to the CI having the id "r004".

Moreover, as illustrated in FIG. 6, the type-combination management table 132 stores the CI type, the relationship type, and the number of applied steps in association with the user information. For example, the type-combination management table 132 stores the user information "engineer01" in association with the CI type "Server", the relationship type "Operated By", and the number of applied steps "-".

The number of applied steps is information indicating the range in which the combination of the CI type and the relationship type is applicable as the access control rule. The "number of steps" indicates the number of relationships traced until reaching a CI of a search result from a CI to be the starting point for search. Details of the number of applied steps are described later.

In this manner, the rule storing unit 13 corresponds to a rule storing unit that stores the id of a core CI in association with the user information and stores the combination of the CI type and the relationship type in association with the user information, as the access control rule set for each user. These access control rules are, for example, stored in advance by a center manager or the like.

The accessible-element storing unit 14 stores the id of a CI or a relationship determined to be accessible by the access enable/disable determining unit 15 to be described later in association with the user information on a user determined to be accessible to the CI or the relationship. In the following, information stored in the accessible-element storing unit 14 is explained. FIG. 7 is a diagram illustrating one example of an accessible-CI management table and FIG. 8 is a diagram illustrating one example of an accessible-relationship management table.

As illustrated in FIG. 7, an accessible-CI management table 141 stores the id of a CI determined to be accessible in association with the user information. For example, the accessible-CI management table 141 stores the ids "r001", "r002", and "r003" of CIs in association with the user information "engineer01". In other words, the accessible-CI management table 141 indicates that a user to which the user information "engineer01" is allocated is accessible to the CIs having the ids "r001", "r002", and "r003".

Moreover, as illustrated in FIG. 8, an accessible-relationship management table 142 stores the id of a relationship determined to be accessible in association with the user information. For example, the accessible-relationship management table 142 stores the ids "007", "008", and "009" of relationships in association with the user information "engineer01". In other words, the accessible-element storing unit 14 indicates that a user to which the user information "engineer01" is allocated is accessible to the relationships having the ids "007", "008", and "009".

The access enable/disable determining unit 15 functions as an access enable/disable determining unit, and when the combination of the type of a CI stored in the core-CI management table 131 associated with the user information and the type of a relationship indicating the relationship between the CI and other CIs is stored in the type-combination management table 132 in association with the user information, the access enable/disable determining unit 15 determines that the other CIs are accessible.

For example, in the core-CI management table 131 illustrated in FIG. 5, assume that the type of the core CI (CI 200a illustrated in FIG. 1) having the id "r004" stored in association with the user information "engineer01" is "Network". In this case, when the combination of the type "Network" of the core CI 200a and the type "Connected To" of a relationship indicating the relationship between the core CI 200a and the CI 200c is stored in the type-combination management table 132 in association with the user information "engineer01", the access enable/disable determining unit 15 determines that the CI 200c is accessible. The type of a core CI is specified by the search process to the configuration-information storing unit 20 by the search processing unit 12.

Moreover, the access enable/disable determining unit 15 stores the id of a CI or a relationship determined to be accessible by a user in the accessible-element storing unit 14 in association with the user information on the user. Then, the access enable/disable determining unit 15 determines that a CI stored in the accessible-element storing unit 14 is a CI accessible by the user to which the user information associated with the CI is allocated. In other words, in the present embodiment, access right information is automatically accumulated in the accessible-element storing unit 14 by performing access control by the access enable/disable determining unit 15.

Moreover, the access enable/disable determining unit 15 determines whether or not access is possible based on information stored in the accessible-element storing unit 14. Specifically, when the combination of the type of a CI stored in the accessible-element storing unit 14 and the type of a relationship indicating the relationship between the CI and other CIs is stored in the type-combination management table 132 in association with the user information, the access enable/disable determining unit 15 determines that a user to which the user information is allocated is accessible to the other CIs.

Figure 9:
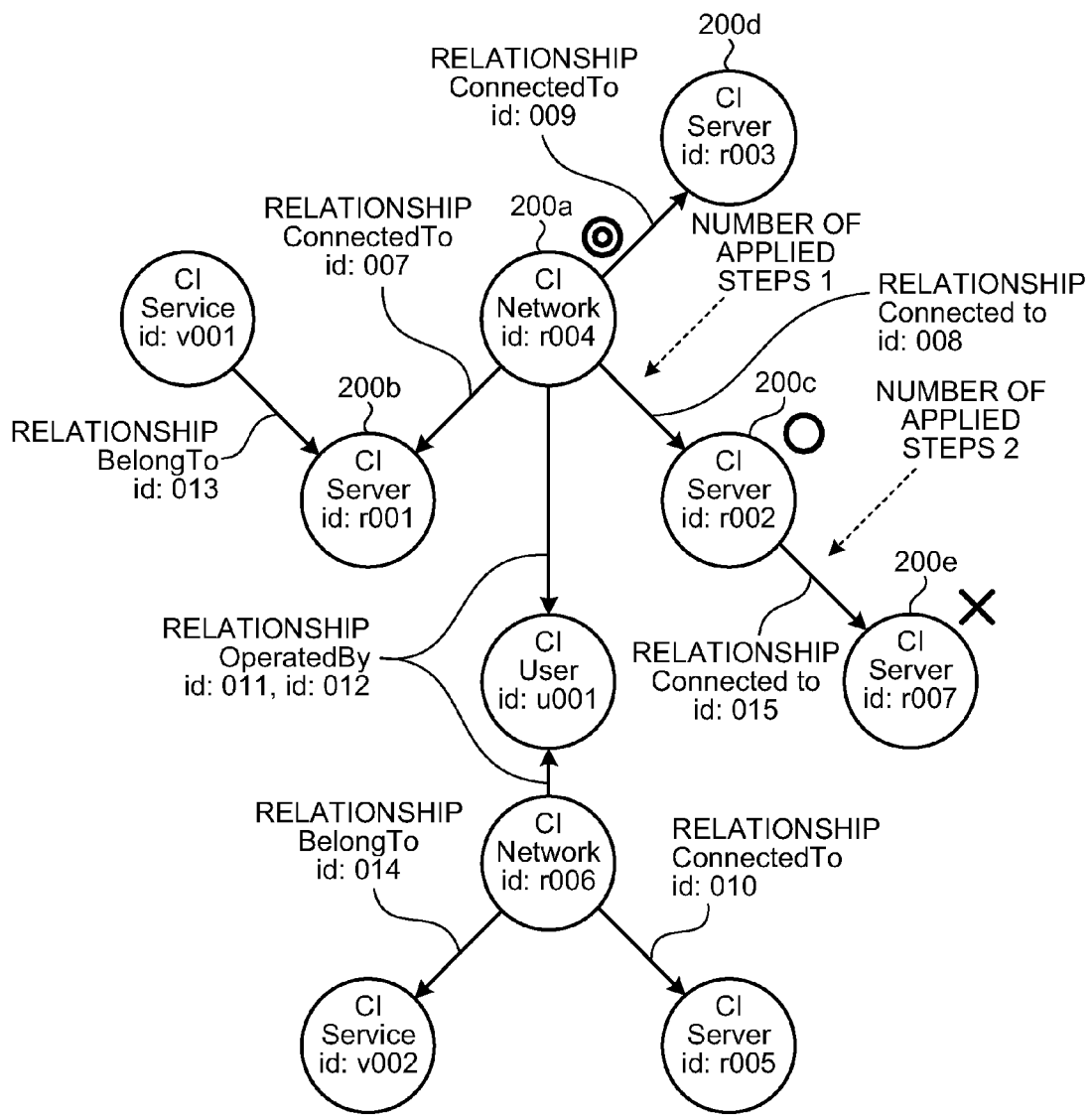
FIG. 9 is a diagram illustrating a condition in which whether or not access is possible is determined by the number of applied steps.

Moreover, in the case where the search request for configuration information from a user is received, even if the combination of the type of a CI stored in the accessible-element storing unit 14 to be described later and the type of a relationship indicating the relationship between the CI and other CIs is stored in the type-combination management table 132 in association with the user information on the user, when the number of relationships traced until reaching the other CIs from a CI to be the starting point is larger than the number of applied steps, the access enable/disable determining unit 15 determines that the other CIs are inaccessible. In the following, this process is explained by using FIG. 9. FIG. 9 is a diagram illustrating a condition in which whether or not access is possible is determined by the number of applied steps.

For example, in the type-combination management table 132, assume that the number of applied steps stored in association with the user information "engineer01", the CI type "Server, and the relationship type "Connected To" is "1" (see FIG. 6). In this case, assume that the search processing unit 12 performs search based on the stepwise search expression "%Network[id=r004]/&Connected TO/%*". In this case, as illustrated in FIG. 9, the number of relationships traced until reaching the CI 200c as one of search results based on the above stepwise search expression from the CI 200a to be the starting point for search is "1". Therefore, the access enable/disable determining unit 15 applies the combination "CI: Network, Rel: Connected To" of the CI type and the relationship type stored in the type-combination management table 132 and determines that a user to which the user information "engineer01" is allocated is accessible to the CI 200c.

On the other hand, assume that the search processing unit 12 performs search based on the stepwise search expression "%Network[id=r004]/&Connected TO/%*/&Connected TO/%*". In this case, the number of relationships traced until reaching a CI 200e as a search result based on the above stepwise search expression from the CI 200a to be the starting point for search is "2". Therefore, the access enable/disable determining unit 15 does not apply the combination "CI: Network, Rel: Connected To" of the CI type and the relationship type stored in the type-combination management table 132 and determines that a user to which the user information "engineer01" is allocated is inaccessible to the CI 200e.

When the access enable/disable determining unit 15 determines to be accessible with respect to a search result based on the stepwise search expression indicating the last step of the search process among the stepwise search expressions generated by the stepwise-search-expression generating unit 11, the result presenting unit 16 transmits the search result to the user terminal 2. Consequently, a user can refer to configuration information according to the search request.

As a specific example of the access control process according to the present embodiment, the case where a user A to which the user information "engineer01" is allocated performs the search request including the search expression "%Network[id=r004]/&Connected TO/%*" is taken as an example, and it is explained how the search expression is processed by the access control unit 10.

First, the stepwise-search-expression generating unit 11 generates the stepwise search expressions "%Network[id=r004]", "%Network[id=r004]/&Connected TO", and "%Network[id=r004]/&Connected TO/%*" based on the search expression "%Network[id=r004]/&Connected TO/%*".

Next, the search processing unit 12 extracts the stepwise search expression "%Network[id=r004]" (defined as "first-step stepwise search expression") including only one search condition from among the generated three stepwise search expressions. Then, the search processing unit 12 performs the search process based on the extracted stepwise search expression "%Network[id=r004]" and obtains information on the CI 200a as a search result (see FIG. 1). In the information on the CI 200a, the type "Network" of the CI 200a is included.

Next, the access enable/disable determining unit 15 determines whether the id "r004" of the CI 200a obtained as the search result is stored in the core-CI management table 131 in association with the user information "engineer01" on the user A. Then, as illustrated in FIG. 5, when the id "r004" of the CI 200a is stored in association with the user information "engineer01", the access enable/disable determining unit 15 determines that the user A is accessible with respect to the stepwise search expression "%Network[id=r004]".

Next, the search processing unit 12 extracts the stepwise search expression "%Network[id=r004]/&Connected TO" including two search conditions from among the three stepwise search expressions and performs the search process. Then, the search processing unit 12 obtains information on three relationships having the ids "007", "008", and "009" connected to the CI 200a as search results (see FIG. 1).

Next, the access enable/disable determining unit 15 determines whether the combination of the type "Network" of the CI 200a and the type "Connected To" of the three relationships having the ids "007", "008", and "009" is stored in the type-combination management table 132 in association with the user information "engineer01" on the user A. Then, as illustrated in FIG. 6, when the combination "Network, Connected TO" of the CI type and the relationship type is stored in the type-combination management table 132 in association with the user information "engineer01", the access enable/disable determining unit 15 determines that the user A is accessible with respect to the stepwise search expression "%Network[id=r004]/&Connected TO". Moreover, the access enable/disable determining unit 15 stores the ids of the CIs 200b to 200d connected to the CI 200a by the above three relationships determined to be accessible in the accessible-element storing unit 14 in association with the user information "engineer01".

Next, the search processing unit 12 extracts the stepwise search expression "%Network[id=r004]/&Connected TO/%*" (defined as "last-step stepwise search expression") including three search conditions from among the three stepwise search expressions generated by the stepwise-search-expression generating unit 11. Then, the search processing unit 12 performs the search process based on the extracted stepwise search expression and obtains information on the CIs 200b to 200d as search results (see FIG. 1).

Next, the access enable/disable determining unit 15 determines whether the ids "r001", "r002", and "r003" of the CIs 200b to 200d obtained as the search results are stored in the accessible-element storing unit 14 in association with the user information "engineer01" on the user A. Then, when the ids "r001", "r002", and "r003" of the CIs 200b to 200d are stored in the accessible-element storing unit 14 in association with the user information "engineer01", the access enable/disable determining unit 15 determines that the user A is accessible with respect to the last-step stepwise search expression "%Network[id=r004]/&Connected TO/%*".

Then, when the access enable/disable determining unit 15 determines to be accessible with respect to the last-step stepwise search expression (i.e., search expression included in the search request from the user A), the result presenting unit 16 presents the information on the CIs 200b to 200d having the ids "r001", "r002", and "r003" to the user A as the search results.

Figure 10:
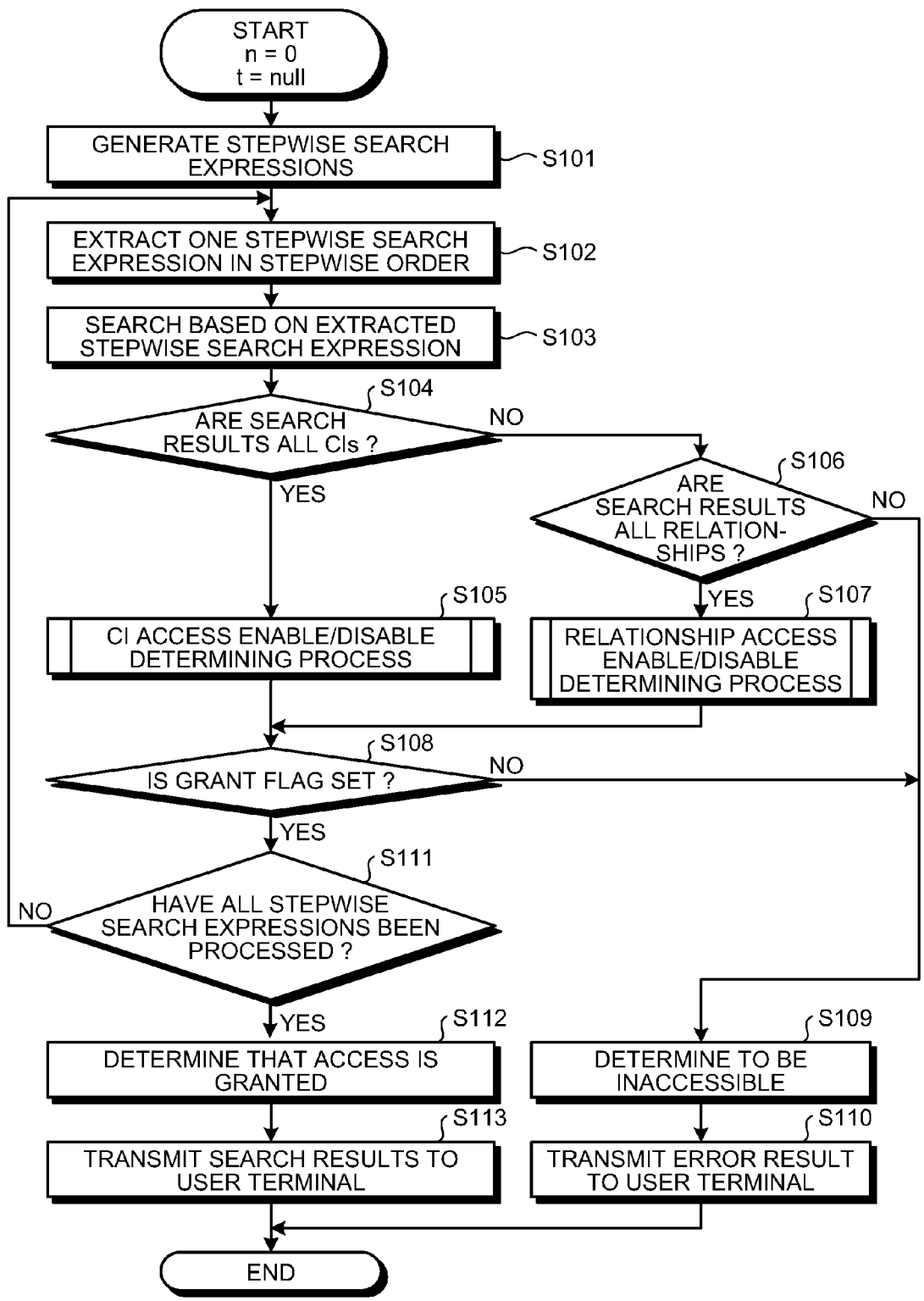
FIG. 10 is a flowchart illustrating a process procedure of an access processing unit according to the present embodiment.

Next, the specific operation of the FCMDB according to the present embodiment is explained with reference to the drawing. FIG. 10 is a flowchart illustrating a process procedure of an access processing unit according to the present embodiment. In FIG. 10, only the process procedure related to access control is illustrated among the process procedures performed by the FCMDB 1.

In the following, in the similar manner to the above-described specific example, the case where the user A to which the user information "engineer01" is allocated performs the search request including the search expression "%Network[id=r004]/&Connected TO/%*" is explained as an example. When performing the process illustrated in FIG. 10, two pieces of information, i.e., "n" and "t" are set. These "n" and "t" are information used in a relationship access enable/disable determining process to be described later, and, at the start of the process, these are set such that n=0 and t=null.

When the search request for configuration information is received from the user terminal 2 that the user A uses, as illustrated in FIG. 10, the stepwise-search-expression generating unit 11 generates the stepwise search expressions based on the search expression included in the search request (Step S101). Specifically, the stepwise-search-expression generating unit 11 generates three stepwise search expressions indicated by "%Network[id=r004]", "%Network[id=r004]/&Connected TO", and "%Network[id=r004]/&Connected TO/%*" based on the search expression "%Network[id=r004]/&Connected TO/%*".

Next, the search processing unit 12 extracts one of the stepwise search expressions generated at Step S101 in a stepwise order (Step S102) and performs search for configuration information stored in the configuration-information storing unit 20 based on the extracted stepwise search expression (Step S103). Specifically, the search processing unit 12 first performs the search process based on the stepwise search expression "%Network[id=r004]" of the first step among the above three stepwise search expressions.

Next, the access control unit 10 determines whether search results are all CIs (Step S104). In this process, when search results are all CIs (Yes at Step S104), the access control unit 10 moves to a CI access enable/disable determining process (Step S105). For example, when the search process is performed based on the stepwise search expression "%Network[id=r004]" and information on the CI 200a is obtained as a search result, the access control unit 10 determines that search results are all CIs and performs the CI access enable/disable determining process. The CI access enable/disable determining process is a process of determining whether or not the CI detected at Step S103 is accessible. The CI access enable/disable determining process is a process illustrated in FIG. 11 and is described later.

On the other hand, at Step S104, when the access control unit 10 does not determine that search results are all CIs (No at Step S104), the access control unit 10 determines whether search results are all relationships (Step S106). In this process, when the access control unit 10 determines that search results are all relationships (Yes at Step S106), the access control unit 10 performs the relationship access enable/disable determining process (Step S107).

For example, assume that the search process is performed based on the stepwise search expression "%Network [id=r004]/&Connected TO", and information on the relationships having the ids [007], [008], and [009], respectively, is obtained as search results. In this case, the access control unit 10 determines that the search results are all relationships and performs the relationship access enable/disable determining process. The relationship access enable/disable determining process is a process of determining whether or not the relationship detected at Step S103 is accessible. The relationship access enable/disable determining process is a process illustrated in FIG. 12 and is described later.

When the processes at Steps S105 and S107 are finished, the access control unit 10 determines whether a grant flag is set (Step S108). The grant flag is a flag set in the CI access enable/disable determining process or the relationship access enable/disable determining process to be described later. In this process, when the grant flag is not set (No at Step S108), i.e., when a deny flag is set or the access control unit 10 does not determine that the search results are all relationships at Step S106 (No at Step S106), the access enable/disable determining unit 15 determines that the user A is inaccessible to the search results (Step S109). Then, the result presenting unit 16 transmits notification that the user A does not have an access right to the user terminal 2 via the network such as the Internet as an error result (Step S110).

On the other hand, when the access control unit 10 determines that the grant flag is set at Step S108 (Yes at Step S108), the access control unit 10 determines whether all of the stepwise search expressions generated at Step S101 have been processed (Step S111). In this process, when not all of the stepwise search expressions have been processed (No at Step S111), the access control unit 10 moves the process to Step S102.

On the other hand, when the access control unit 10 determines that all of the stepwise search expressions have been processed (Yes at Step S111), the access enable/disable determining unit 15 determines that the user A is accessible to search results, i.e., the user A has an access right (Step S112). Then, the result presenting unit 16 transmits the search results by the search processing unit 12 to the user terminal 2 via the network (Step S113). When the processes at Steps S110 and S113 are finished, the access control unit 10 ends the process procedure related to the access control.

Figure 11:
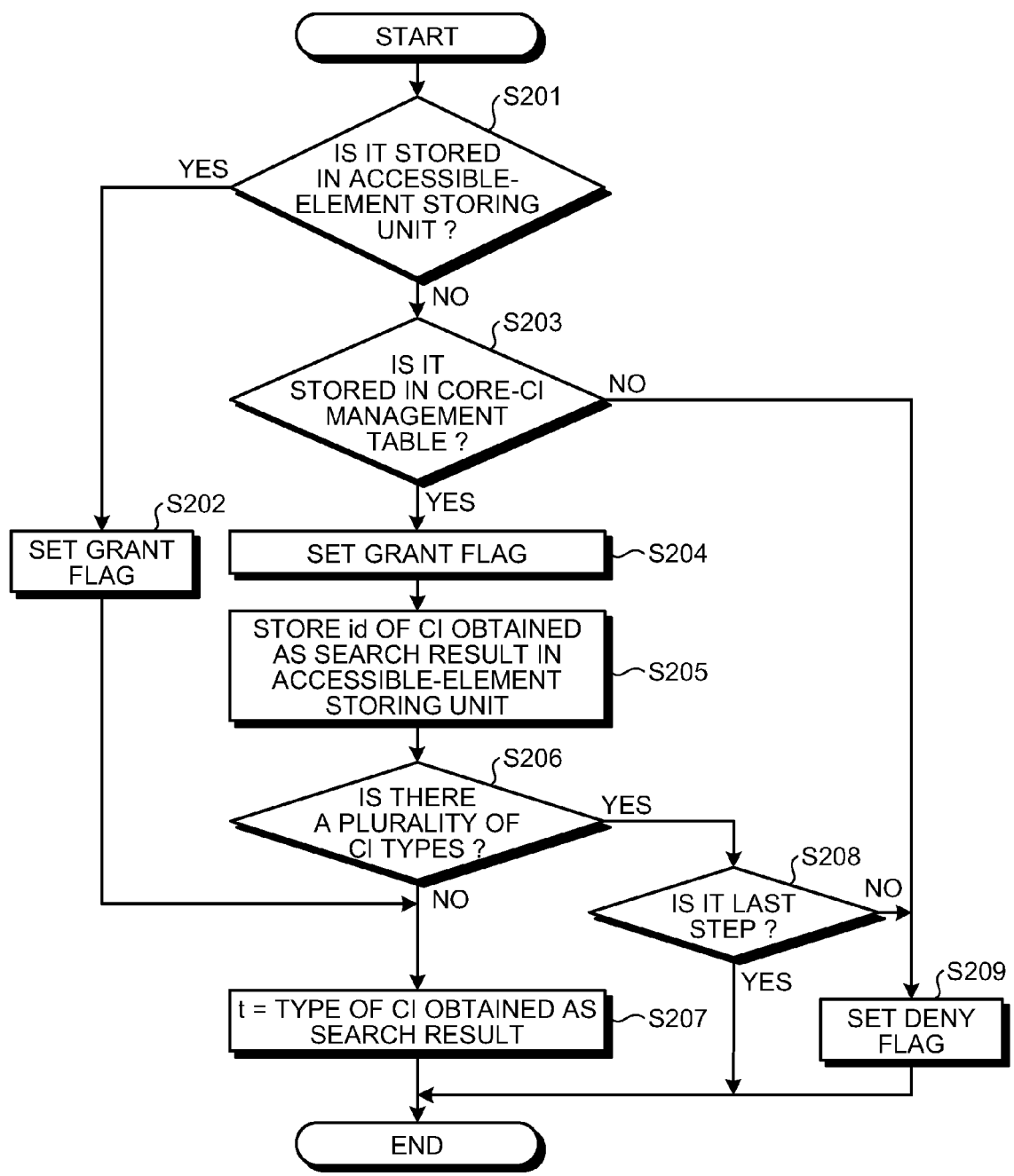
FIG. 11 is a flowchart illustrating a process procedure of a CI access enable/disable determining process.

Next, the CI access enable/disable determining process illustrated at Step S105 is explained with reference to FIG. 11. FIG. 11 is a flowchart illustrating the process procedure of the CI access enable/disable determining process.

As illustrated in FIG. 11, when the CI access enable/disable determining process is started, the access enable/disable determining unit 15 determines whether the id of a CI obtained as a search result is stored in the accessible-element storing unit 14 in association with the user information on the user A (Step S201). In this process, when the access enable/disable determining unit 15 determines that the id of the CI obtained as the search result is stored in the accessible-element storing unit 14 in association with the user information on the user A (Yes at Step S201), the access enable/disable determining unit 15 sets the grant flag (Step S202).

On the other hand, when the id of the CI obtained as the search result is not stored in the accessible-element storing unit 14 in association with the user information on the user A (No at Step S201), the access enable/disable determining unit 15 determines whether the id of the CI is stored in the core-CI management table 131 in association with the user information on the user A (Step S203). In this process, when the access enable/disable determining unit 15 determines that the id of the CI obtained as the search result is stored in the core CI management table 131 in association with the user information on the user A (Yes at Step S203), the access enable/disable determining unit 15 sets the grant flag (Step S204).

Next, the access enable/disable determining unit 15 stores the id of the CI obtained as the search result in the accessible-element storing unit 14 (Step S205). Next, the access enable/disable determining unit 15 determines whether there is a plurality of types of CIs obtained as search results (Step S206). In other words, when there is a plurality of CIs obtained as the search results, the access enable/disable determining unit 15 determines whether the types of these CIs are different.

In this process, when there is not a plurality of types of CIs obtained as the search results (No at Step S206), or when the process at Step S202 is finished, the access enable/disable determining unit 15 sets the type of the CI obtained by the search process as the information "t" on the CI type used in the relationship access enable/disable determining process to be described later (Step S207). For example, when the CI 200a is obtained as a search result, the access enable/disable determining unit 15 sets "Network" as the information "t" on the CI type used in the relationship access enable/disable determining process to be described later.

On the other hand, at Step S206, when the access enable/disable determining unit 15 determines that there is a plurality of types of CIs obtained as the search results (Yes at Step S206), the access enable/disable determining unit 15 determines whether the search process by the search processing unit 12 is the search process based on the last-step stepwise search expression (Step S208). The last-step stepwise search expression is the same as the search expression included in the search request from a user, and, in this example, is the stepwise search expression indicated by "%Network [id=r004]/&Connected TO/%*".

In this process, when the search process by the search processing unit 12 is not the search process based on the last-step stepwise search expression (No at Step S208) or, at Step S203, when the id of the CI obtained as the search result is not stored in the core CI management table 131 in association with the user information on the user A (No at Step S203), the access enable/disable determining unit 15 sets the deny flag (Step S209).

When the processes at Steps S207 and S209 are finished or, at Step S208, when the access enable/disable determining unit 15 determines that the search process by the search processing unit 12 is the search process based on the last-step stepwise search expression (Yes at Step S208), the access enable/disable determining unit 15 ends the CI access enable/disable determining process.

Figure 12:
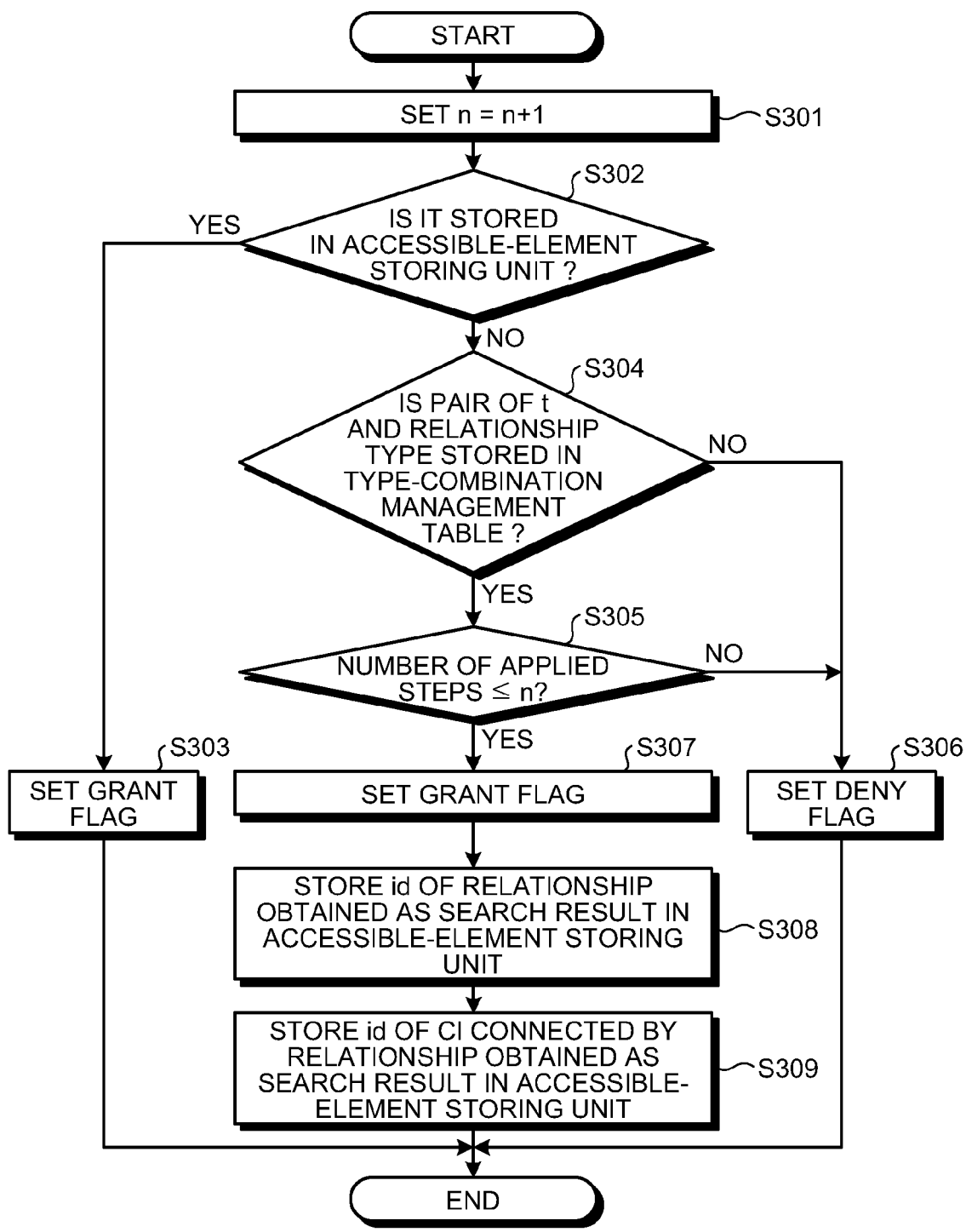
FIG. 12 is a flowchart illustrating a process procedure of a relationship access enable/disable determining process.
Figure 13:
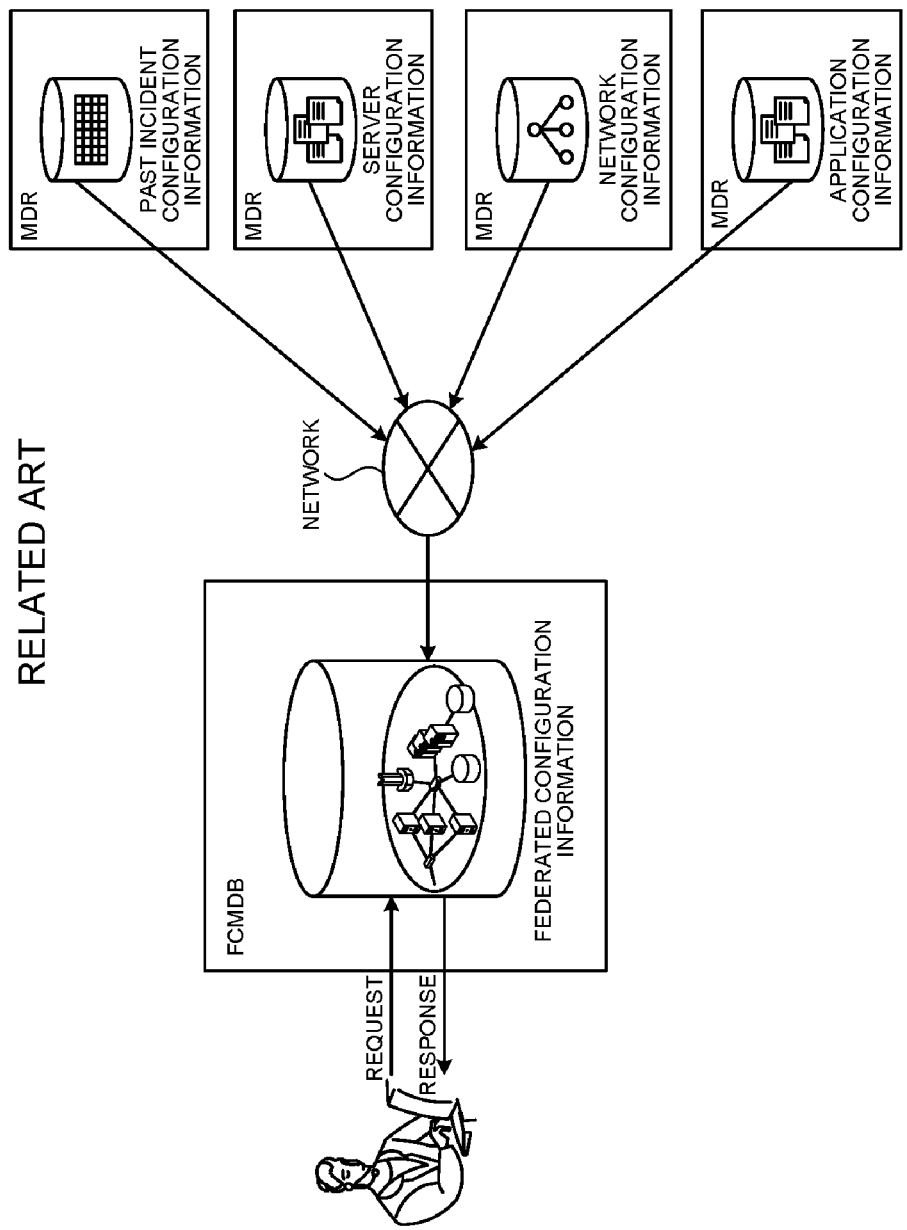
FIG. 13 is a diagram explaining a summary of the FCMDB.
Figure 14:
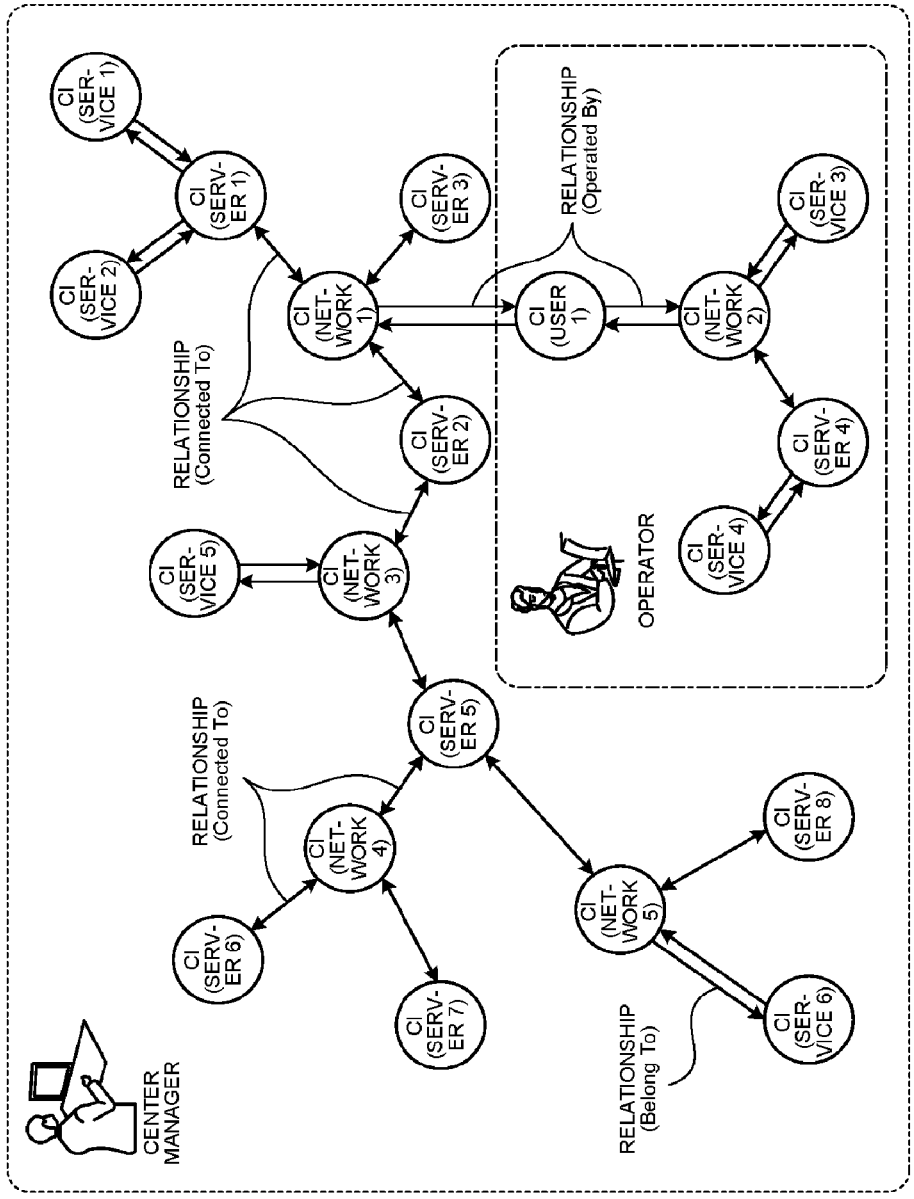
FIG. 14 is a diagram illustrating a condition in which an access right according to a position of a worker is given with respect to configuration information managed by the FCMDB.

Next, the relationship access enable/disable determining process at Step S107 is explained with reference to FIG. 12. FIG. 12 is a flowchart illustrating the process procedure of the relationship access enable/disable determining process.

As illustrated in FIG. 12, when the relationship access enable/disable determining process is started, the access enable/disable determining unit 15 sets n=n+1 (Step S301). For example, when n is an initial set value "0", the access enable/disable determining unit 15 sets n to "1".

Next, the access enable/disable determining unit 15 determines whether the id of a relationship obtained as a search result is stored in the accessible-element storing unit 14 in association with the user information on the user A (Step S302). In this process, when the access enable/disable determining unit 15 determines that the id of the relationship obtained as the search result is stored in the accessible-element storing unit 14 in association with the user information on the user A (Yes at Step S302), the access enable/disable determining unit 15 sets the grant flag (Step S303).

On the other hand, assume that the id of the relationship obtained as the search result is not stored in the accessible-element storing unit 14 in association with the user information on the user A (No at Step S302). In this case, the access enable/disable determining unit 15 determines whether the combination of the type of the relationship obtained as the search result and "t" (for example, the type of a CI obtained as a search result of the stepwise search expression "%Network[id=r004]") set at Step S207 is stored in the type-combination management table 132 in association with the user information on the user A (Step S304). In this process, when the combination of the type of the relationship obtained as the search result and "t" is stored in the type-combination management table 132 (Yes at Step S304), the access enable/disable determining unit 15 moves the process to Step S305.

At Step S305, the access enable/disable determining unit 15 determines whether the number of applied steps, which is associated with the combination same as the combination of the type of the relationship obtained as the search result and "t" stored in the type-combination management table 132, is n or less. In this process, when the number of applied steps is not n or less (No at Step S305) or, at Step S304, when the combination of the type of the relationship obtained as the search result and "t" is not stored in the type-combination management table 132 (No at Step S304), the access enable/disable determining unit 15 sets the deny flag (Step S306).

On the other hand, at Step S305, when the access enable/disable determining unit 15 determines that the number of applied steps is n or less (Yes at Step S305), the access enable/disable determining unit 15 sets the grant flag (Step S307) and stores the id of the relationship obtained as the search result in the accessible-element storing unit 14 (Step at S308).

Then, the access enable/disable determining unit 15 stores the id of a CI, which is connected to a CI of a search result obtained based on the stepwise search expression of the previous step by the relationship obtained by the search result this time, in the accessible-element storing unit 14 (Step S309). For example, when information on the CI 200*a* is obtained as a search result based on the stepwise search expression "%Network[id=r004]", the ids of the CIs 200*b* to 200*d* connected to the CI 200*a*, respectively, by the relationships having the ids "007", "008", and "009" as search results based on the stepwise search expression "%Network[id=r004]/&Connected TO/" of the next step are stored in the accessible-element storing unit 14.

When the processes at Steps S303, S306, and S309 are finished, the access enable/disable determining unit 15 ends the relationship access enable/disable determining process.

As described above, in the present embodiment, as the access control rule set for each user, a core CI is stored in association with the user information and the combination of the CI type and the relationship type is stored in association with the user information, and when the combination of the type of a core CI associated with certain user information and the type of a relationship indicating the relationship between the core CI and other CIs is stored in association with the user information, the other CIs are determined to be accessible.

Consequently, a worker such as a system manager only needs to perform a setting operation of the access control rule as the setting operation of an access right, and, for example, does not need to perform an operation such as setting of an access right for each one of CIs and relationships stored in the configuration-information storing unit 20. In other words, according to the present embodiment, setting of an access right to configuration information on an IT system can be performed efficiently.

Moreover, in the present embodiment, configuration information determined to be accessible by the access enable/disable determining unit 15 is stored in the accessible-element storing unit 14 in association with the user information and configuration information stored in the accessible-element storing unit 14 is determined as configuration information accessible by a user having the user information associated with the configuration information.

Consequently, configuration information stored in the accessible-element storing unit 14 can be determined to be accessible without referring to the core-CI management table 131 or the type-combination management table 132, enabling to simplify the process procedure of the access control process.

Moreover, in the present embodiment, when the combination of the type of a CI stored in the accessible-element storing unit 14 in association with certain user information and the type of a relationship indicating the relationship between the CI and other CIs is stored in the type-combination management table 132 in association with the user information, the access enable/disable determining unit 15 determines that the other CIs are accessible.

In this manner, by using a CI determined to be accessible by the access enable/disable determining unit 15 as a core CI, setting of an access right can be performed more efficiently.

Moreover, in the present embodiment, in the case where the access enable/disable determining unit 15 receives the search request from a certain user, even if the combination of the type of a CI stored in the accessible-element storing unit 14 in association with the user information on the user and the type of a relationship indicating the relationship between the CI and other CIs is stored in association with the user information on the user, when the number of relationships traced until reaching the other CIs from a CI to be the starting point for search is larger than the number of applied steps stored in the type-combination management table 132, the access enable/disable determining unit 15 determines that the other CIs are inaccessible.

Consequently, application of the combination of the CI type and the relationship type stored in the type-combination management table 132 can be limited according to the need, so that more detailed setting of an access right becomes possible.

As above, some embodiments of the present invention are explained in detail based on the drawings, however, these are examples and the present invention can be practiced by other embodiments to which various modifications and improvements are made based on the knowledge of those skilled in the art including an aspect described in the column of the disclosure of invention.

For example, in the present embodiment, when there is a plurality of types of CIs obtained by the search process of the search processing unit 12 and the search process is not a process based on the last-step stepwise search expression (No at Step S208 in FIG. 11), "t" may not be uniquely determined, so that the deny flag is set. In other words, in this case, a search result is not presented to a user. Therefore, it is applicable that even in this case, a search result can be presented to a user.

For example, assume that the search request, which includes the search expression "%Network[id=r006]/&*/%*/&Connected TO/%*" (search expression requesting information on a CI connected to a CI having any relationship with the network having the id "r006"), is received from a user. Moreover, in this case, assume that as search results based on the stepwise search expression "%Network [id=r006]/&*/%*", a CI (type is "User") having the id "u001", a CI (type is "Service") having the id "v002", and a CI (type is "Server") having the id "r005" are obtained (see FIG. 1).

In such a case, first, the access enable/disable determining unit 15 performs the search processes based on the search expressions "entity_id(u001)/&Connected TO", "entity_id (v002)/&Connected TO", and "entity_id(r005)/&Connected TO", respectively. Then, the search processing unit 12 performs search based on the search expression "entity_id(id of the obtained search result)/%*" by using the id of a CI (or a relationship) obtained as a result of the above each search expression.

In this manner, when a CI having a different CI type is included in CIs obtained as search results of the search processing unit 12, the access control unit 10 performs the processes illustrated in FIGS. 10 to 12 for each CI type. Then, when the grant flag is set to all of them, the result presenting unit 16 presents the final search result to a user. Consequently, even when a plurality of CI types is included in a search result, the search result can be presented to the user.

According to an aspect of an embodiment of the access control apparatus, the information management apparatus, and the access control method disclosed herein, an effect is obtained that setting of an access right to configuration information on an information system can be efficiently performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An access control apparatus that controls access to an information management apparatus that stores a plurality of configuration elements and relationship elements indicating relationships between the configuration elements, the access control apparatus comprising:
   a memory that stores one or more predetermined configuration elements in association with user information that identifies a user and stores one or more combinations of a type of a configuration element and a type of a relationship element and a number of applied steps indicating a range in which the combinations are applicable as an access control rule in association with the user information, the access control rule set for each user; and
   a processor coupled to the memory, wherein the processor executes a process comprising:
   determining that, when a combination of a type of a configuration element stored in the memory in association with user information and a type of a relationship element indicating a relationship between the configuration element and another configuration element is stored in the memory in association with the user information, the another configuration element is accessible; and
   storing, in the memory, configuration elements determined to be accessible at the determining in association with user information on the user, wherein
   in a case where a search expression specifying a configuration element to be a starting point for search and specifying an order of tracing a plurality of relationship elements and configuration elements with the configuration element as the starting point is obtained as a search request for configuration information from the user, even if the combination is stored in the memory in association with user information on the user, when a number of relationship elements traced until reaching the another configuration element from the configuration element to be the starting point is larger than the number of applied steps, the determining includes determining that the another configuration element is inaccessible.

2. The access control apparatus according to claim 1, further comprising further storing unit that storing, in the memory, configuration elements determined to be accessible by the determining in association with user information on the user, wherein
   the determining determines that a configuration element stored in the memory is a configuration element to which a user having user information associated with the configuration element is accessible.

3. The access control apparatus according to claim 2, wherein the determining, when a combination of a type of a configuration element stored in the memory and a type of a relationship element indicating a relationship between the configuration element and another configuration element is stored in the memory in association with user information on the user, includes determining that the another configuration element is accessible.

4. An information management apparatus comprising:
   a memory that stores a plurality of configuration elements and relationship elements indicating relationships between the configuration elements and
   that stores one or more predetermined configuration elements in association with user information that identifies a user and stores one or more combinations of a type of a configuration element and a type of a relationship element in association with the user information, as an access control rule set for each user; and
   a processor coupled to the memory, wherein the processor executes a process comprising:
   determining that, when a combination of a type of a configuration element stored in the memory in association with user information and a type of a relationship element indicating a relationship between the configuration element and another configuration element is stored in the memory in association with the user information, the another configuration element is accessible; and
   storing, in the memory, configuration elements determined to be accessible at the determining in association with user information on the user, wherein
   in a case where a search expression specifying a configuration element to be a starting point for search and specifying an order of tracing a plurality of relationship elements and configuration elements with the configuration element as the starting point is obtained as a search request for configuration information from the user, even if the combination is stored in the memory in association with user information on the user, when a number of relationship elements traced until reaching the another configuration element from the configuration element to be the starting point is larger than the number of applied steps, the determining includes determining that the another configuration element is inaccessible.

5. The information management apparatus according to claim 4, further comprising further storing unit that stores, in the memory, configuration elements determined to be accessible by the determining in association with user information on the user, wherein
the determining unit determines that a configuration element stored in the memory is a configuration element to which a user having user information associated with the configuration element is accessible.

6. The information management apparatus according to claim 5, wherein the determining, when a combination of a type of a configuration element stored in the memory and a type of a relationship element indicating a relationship between the configuration element and another configuration element is stored in the memory in association with user information on the user, includes determining that the another configuration element is accessible.

7. An access control method for controlling access to an information management apparatus that stores a plurality of configuration elements and relationship elements indicating relationships between the configuration elements, the access control method comprising:
storing one or more predetermined configuration elements in association with user information that identifies a user and one or more combinations of a type of a configuration element and a type of a relationship element in association with the user information, as an access control rule set for each user; and
determining that, when a combination of a type of a configuration element stored by the storing in association with user information and a type of a relationship element indicating a relationship between the configuration element and another configuration element is stored by the storing in association with the user information, the another configuration element is accessible; and
storing configuration elements determined to be accessible at the determining in association with user information on the user, wherein
in a case where a search expression specifying a configuration element to be a starting point for search and specifying an order of tracing a plurality of relationship elements and configuration elements with the configuration element as the starting point is obtained as a search request for configuration information from the user, even if a combination of a type of a configuration element stored by the storing and a type of a relationship element indicating a relationship between the configuration element and another configuration element is stored in association with user information on the user, when a number of relationship elements traced until reaching the another configuration element from the configuration element to be the starting point is larger than the number of applied steps, the determining includes determining that the another configuration element is inaccessible.

8. The access control method according to claim 7, further comprising further storing configuration elements determined to be accessible by the determining in association with user information on the user, wherein
the determining determines that a configuration element stored by the further storing is a configuration element to which a user having user information associated with the configuration element is accessible.

9. The access control method according to claim 8, wherein the determining, when a combination of a type of a configuration element stored by the further storing and a type of a relationship element indicating a relationship between the configuration element and another configuration element is stored in association with user information on the user, includes determining that the another configuration element is accessible.

* * * * *

UNITED STATES PATENT AND TRADEMARK OFFICE
CERTIFICATE OF CORRECTION

PATENT NO.       : 8,561,132 B2
APPLICATION NO.  : 13/232392
DATED            : October 15, 2013
INVENTOR(S)      : Hiroshi Otsuka et al.

Page 1 of 1

It is certified that error appears in the above-identified patent and that said Letters Patent is hereby corrected as shown below:

In the Claims

In Column 15, Line 58, In Claim 1, before "the" insert -- as --.
In Column 16, Line 19, In Claim 2, delete "storing unit that storing," and insert -- storing, --, therefor.
In Column 17, Line 4, In Claim 5, delete "storing unit that storing," and insert -- storing, --, therefor.
In Column 17, Line 8, In Claim 5, after "determining" delete "unit".
In Column 17, Line 30, In Claim 7, after "user;" delete "and".

Signed and Sealed this
Eighteenth Day of February, 2014

Michelle K. Lee
*Deputy Director of the United States Patent and Trademark Office*